United States Patent [19]

Rohde et al.

[11] Patent Number: 4,661,368

[45] Date of Patent: Apr. 28, 1987

[54] SURFACE LOCATING AND DISPENSED DOSAGE SENSING METHOD AND APPARATUS

[75] Inventors: Robert R. Rohde, Apalachin; Joseph J. Bedard, Endicott, both of N.Y.

[73] Assignee: Universal Instruments Corporation, Binghamton, N.Y.

[21] Appl. No.: 777,262

[22] Filed: Sep. 18, 1985

[51] Int. Cl.⁴ ............................................. H05K 3/30
[52] U.S. Cl. ........................................ 427/8; 118/323; 118/410; 118/669; 118/692; 427/58; 427/96; 427/207.1
[58] Field of Search ............... 118/669, 692, 323, 410; 427/8, 96, 58, 207.1

[56] References Cited

U.S. PATENT DOCUMENTS

| | | | |
|---|---|---|---|
| 3,961,599 | 6/1976 | Jones | 118/410 |
| 4,346,124 | 8/1982 | Wood | 427/96 |
| 4,485,387 | 11/1984 | Drumheller | 118/410 |
| 4,515,297 | 5/1985 | Schoenthaler | 427/96 |
| 4,530,862 | 7/1985 | Kerzel | 118/669 |
| 4,569,305 | 2/1986 | Ferri | 427/96 |
| 4,572,103 | 2/1986 | Engel | 118/410 |

*Primary Examiner*—John D. Smith
*Attorney, Agent, or Firm*—Fidelman, Wolffe & Waldron

[57] ABSTRACT

A dispensing nozzle tip is advanced into engagement with the particular position of the circuit board to which material is to be applied, and a reactive force on the nozzle tip from the circuit board is sensed by variation in the output from a load cell such that an exact spacing may be provided between the nozzle tip and that portion of the surface to which material is to be dispensed. Having provided such spacing between the tip and surface, the flowable material is dispensed and a reactive force from the surface, via the flowable material, is sensed by the load cell arrangement to provide for metering of a dose of the flowable material. Such surface location and dispensed dosage sensing is performed for every dose of material to be applied.

18 Claims, 1 Drawing Figure

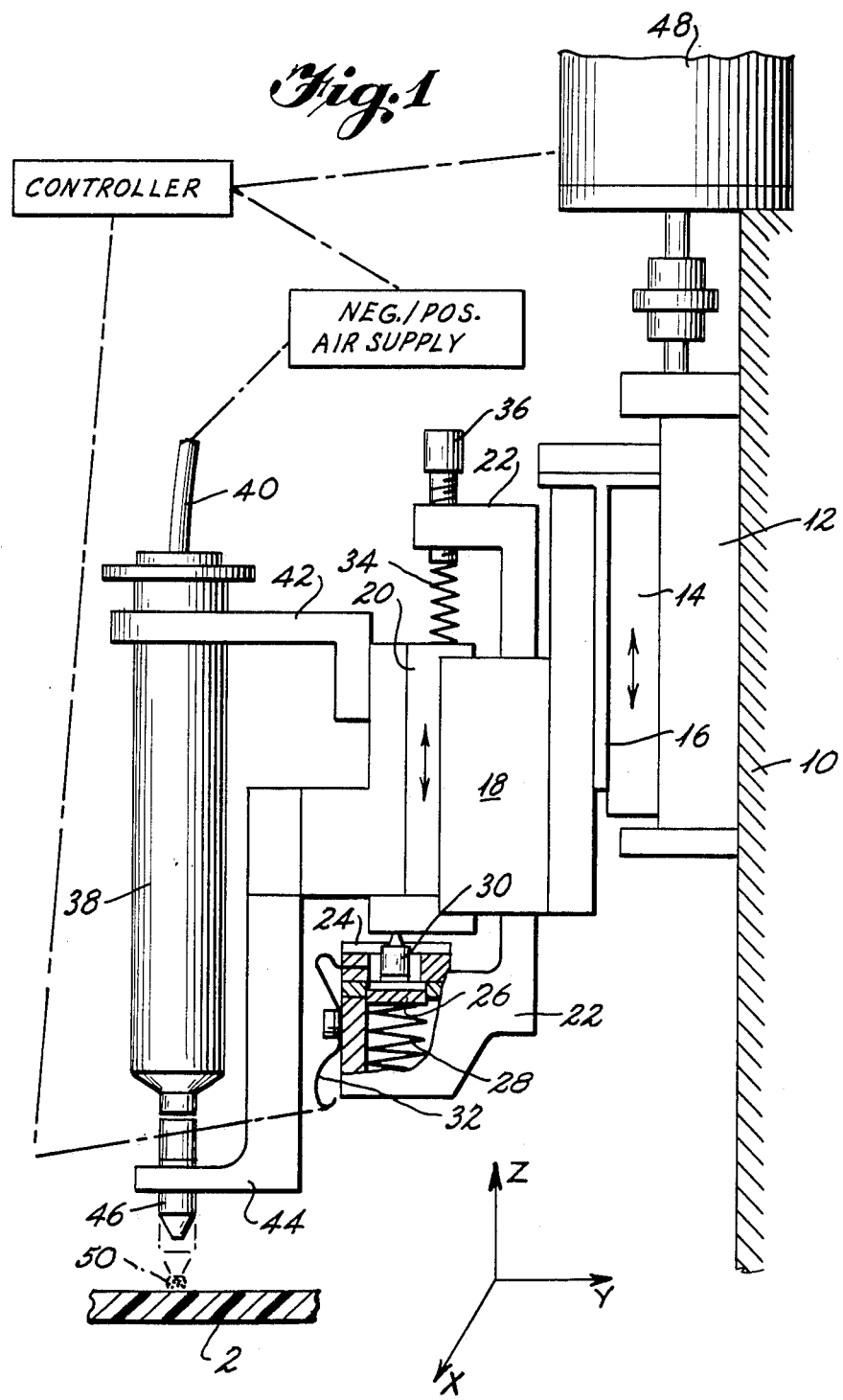

SURFACE LOCATING AND DISPENSED DOSAGE SENSING METHOD AND APPARATUS

BACKGROUND AND SUMMARY OF THE INVENTION

This invention relates to a method and apparatus for depositing flowable material onto a surface by locating the particular position on the surface to which the material is to be deposited and thereafter depositing a metered dosage of the material at that particular position.

The method and apparatus of the present invention are particularly applicable for depositing equal dots of adhesive onto particular surface portions of a circuit board regardless of surface variations in the circuit board due to such things as warpage.

Prior art attempts to locate particular surface points in spaced relation to a dispensing nozzle tip having included vision systems at least an order of magnitude greater in cost than the instant invention.

A prior art attempt at solving the problem of board warpage included a depth stop located near the dispensing nozzle to regulate spacing between the nozzle and the board. However, surface variations could and did occur between the depth stop and the particular point on the surface to which the adhesive dot was to be dispensed, resulting in a lesser or greater spacing between the nozzle tip and surface and a respectively smaller or larger dot size. This approach also presented a bigger "footprint" in that the depth stop limited the closeness to which the adhesive dot could be applied to surrounding, previously applied components.

Accordingly, it is an object of the invention to minimize the footprint of the apparatus of the instant invention to that of the tip of the nozzle itself.

It is another object of the invention to sense a particular position on the surface of the circuit board and accurately space the dispensing tip therefrom, regardless of board warpage, for repeatable dispensing of a flowable material dose, such as a dot of adhesive.

Still further, it is an object of the invention to provide for dosage metering of the flowable material by sensing the material during depositing thereof.

Additionally, it is an object of the invention to sense engagement of the onset of the dose with the surface onto which it is dispensed in order to control the dosage.

In a preferred embodiment of the invention, a dispensing nozzle tip is advanced into engagement with the particular position of the circuit board to which material is to be applied while the reactive force on the nozzle tip from the circuit board is sensed by variation in the output from a load cell such that an exact spacing may be provided between the nozzle tip and that portion of the surface to which material is to be dispensed. Having provided such spacing between the tip and surface, the flowable material, in this case adhesive utilized to hold the subsequently applied surface mounted components onto the circuit board, is dispensed and a reactive force from the surface is again sensed by the load cell arrangement via the flowable material itself. Surface location and dispensed dosage sensing is performed for every dose of material to be applied.

BRIEF DESCRIPTION OF THE FIGURE

FIG. 1 is a side elevation illustrating the apparatus of the invention.

DETAILED DESCRIPTION OF THE INVENTION

As seen in FIG. 1, a primary guide 12 is fixed to a main support 10 and primary roller slide 14 is movable in guide 12 under the control of servomotor and Z-axis encoder 48. A secondary guide 18 is attached to primary slide 14, with a damping material 16 provided therebetween to prevent transmission of any mechanical vibrations to the secondary guide 18. Guide 18 has a bracket 22 attached thereto with laterally extending upper and lower arms. The lower arm acts as a support for load cell 30 which is retained within the support by top retainer plate 24 and bottom movable plate 26. Movable plate 26 is biased upwardly by spring 28 which provides protection from overloading the load cell by allowing plate 26 to displace downwardly if a damaging pressure is applied to the top of load cell 30. Secondary slide member 20 is movable in secondary guide 18 and has upper and lower brackets 42, 44 attached thereto for supporting reservoir 38. The combined mass of secondary slide 20, brackets 42 and 44, and reservoir 38 bears against load cell 30, with spring 34 biasing this mass into engagement with the load cell. By such an arrangement, adjustable screw 36 may vary the compression of spring 34 and thus the preload on load cell 30.

Reservoir 38 has a nozzle 46 through which a flowable material is dispensed upon application of positive air to the top of the material in reservoir 38 via tubing 40. A negative pressure may also be applied to tubing 40 in an amount sufficient to keep the flowable material from dripping out of the tip of nozzle 46. A controller, such as a microprocessor or the like, is operatively associated with the servomotor/encoder 48, load cell 30, and the negative and positive air supplies in order to provide overall control of the device.

In operation, servomotor/encoder 48 is driven at maximum servo curve controlled speed to move the tip of nozzle 46 to a programmable location above the surface of circuit board 2. Upon reaching this programmable location, the servo smoothly changes speed to a slow slew motion until the tip of nozzle 46 contacts the surface of circuit board 2. Thus, increased pressure between nozzle 46 and the surface of circuit board 2 will provide a differential lowering of the force on load cell 30 commensurate with the force applied to circuit board 2 by nozzle 46. This differential force on load cell 30 may be monitored in order to halt servomotor 48 upon touching the surface of the circuit board. According to the instant invention the exact location of the tip of nozzle 46, at the time of attaining a particular force differential, is recorded in memory such that any overtravel will not affect the sensing of the exact location of the top surface of the circiuit board. Further, any overtravel, caused by not being able to stop servomotor 48 at the exact time at which a particular force is applied to the circuit board, is absorbed by slide 20 moving upwardly relative to guide 18 upon continued downward movement of slide 14 under the influence of servo 48. Having thus sensed and recorded the location of the portion of circuit board 2 engaged by the tip of nozzle 46, servo 48 may be driven in a reverse direction to raise the tip of nozzle 46 and space it a particular distance above that portion of the circuit board which is sufficient for application of an exact dose of the particular flowable material being applied to the surface.

Metering of the flowable material is also provided by the instant invention. Accordingly, a differential force is also imparted to the load cell 30 by the reactive force transmitted to the tip of nozzle 46 via a dose 50 of the flowable material. A positive air pulse may be initiated to dispense material from the nozzle 46 and the very slight back pressure on the nozzle from the surface via the dose of flowable material may be monitored according to this differential force to meter the dose of material by halting the positive air pressure and applying a vacuum sufficient to keep the flowable material from dripping out of the nozzle 46.

Thus, a particular point on a surface, even though the surface may be warped, may be located for exact location of a metered dose of flowable material thereto with such metering not being affected by the warpage of the surface.

In one embodiment, only the onset of the dose touching the surface is used to provide the force differential and to initiate an air pulse, with the duration of the pulse being timed selectively (as by a program variable) to result in a particular dosage. Upon actuating the dispenser, by the pulse of positive air, an air bubble exiting the nozzle tip would fail to result in an expected force differential at the load cell, so that such a defect in dispensing is detectable.

Alternatively, a particular force differential may indicate a particular dosage dispensed so that, with only a partial dose of the flowable material exiting the nozzle tip followed by an air bubble, dispensing of an incorrect dose is detectable.

In practice of the invention with a prototype, the flowable material used was Amicon ®D124F (an adhesive) manufactured by W. R. Grace, Inc., Lexington, Mass. A cycle time for applying each dot of material included x-y positioning of the circuit board and movement of the servo controlled head from the dispensing position back to an initial start position for each dot such that approximately 4 dots per second could be applied.

The load cell force differential sensed in order to find the board amounted to approximately 15-20 grams, with sensitivity being approximately 25 millivolts per pound. With a load cell having a capacity of approximately 10 pounds, the cell was preloaded by approximately 9 pounds in order to read a force differential of 15-20 grams. To meter the dosage, engagement of the adhesive with a circuit board was sensed at onset of the applied positive air pulse, so that pulse duration was controlled according to a preselectable time period, after which negative air pressure replaced the positive air pressure. It was found that a spacing between the tip and the surface of the circuit board of approximately 0.002 inches was sufficient for use with the above disclosed adhesive.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense. Although a thixotropic material was utilized and described with a prototype of the instant invention, it is contemplated that flowable materials of other viscosities according to the spacing provided between the point at which the material is to be deposited and the tip of the nozzle, may be meterable. With appropriate modification to the apparatus, it is even within the purview of this invention that material viscosities on the order of that of water may be utilized.

It is also to be understood that the following claims are intended to cover all of the generic and specific features of the invention herein described and all statements of the scope of the invention which, as a matter of language, might be said to fall therebetween.

We claim:

1. A method of depositing a dose of flowable material from a tip onto a surface, and comprising the steps of:
    advancing said tip toward and into engagement with a portion of said surface and sensing a reactive force on said tip from said surface;
    recording a position, on a path of said advancing, when a particular value of said reactive force is attained;
    halting said advancing according to attaining said position;
    retracting said tip away from said surface portion and back past said position by a preferred distance; and
    depositing a dose of said flowable material onto said surface portion from said tip.

2. A method as in claim 1, and further comprising the steps of:
    providing a thixotropic material as said flowable material and dispensing said material from a nozzle having said tip;
    applying positive pressure to said material in order to effect said dispensing; and
    halting said positive pressure to halt said dispensing.

3. A method as in claim 2, and further comprising the step of:
    removing said positive pressure and applying a negative pressure to said flowable material selectively in order to prevent inadvertent dispensing thereof.

4. A method as in claim 1, and further comprising the steps of:
    providing a pressure transducer; and
    transmitting at least a portion of said reactive force to said pressure transducer to effect said sensing.

5. A method as in claim 4, and further comprising the step of:
    providing a load cell as said pressure transducer.

6. A method of depositing a dose of flowable material from a tip onto a surface, and comprising the steps of:
    advancing said tip toward and into engagement with a portion of said surface and sensing a reactive force on said tip from said surface;
    recording a position, on a path of said advancing, when a particular value of said reactive force is attained;
    halting said advancing according to attaining said position;
    retracting said tip away from said surface portion and back past said position by a distance sufficient that another force, from said surface via said flowable material, is impressable on said tip during said depositing;
    depositing some of said flowable material onto said surface and sensing said other force on said tip during said depositing; and
    controlling said dose in response to said sensing of said other force.

7. A method of positioning a dispensing nozzle tip in spaced relation to a portion of a surface and dispensing a particular dose of flowable material from said tip onto said surface portion, and comprising the steps of:
 advancing said tip toward and into engagement with said surface portion and sensing a reactive force on said tip from said surface;
 recording a position, on a path of said advancing, when a particular value of said reactive force is attained;
 halting said advancing according to attaining said position;
 retracting said tip away from said surface portion and back past said position by a preferred distance;
 applying positive pressure to said flowable material in order to effect said dispensing;
 sensing a back pressure on said flowable material from said surface during said dispensing; and
 metering said dose of material in response to said back pressure and according to a controller.

8. A method as in claim 7, and further comprising the step of:
 removing said positive pressure and applying a negative pressure to said flowable material selectively in order to prevent inadvertant dispensing thereof.

9. A method of applying flowable adhesive from a nozzle tip to selected portions of a substrate in order to attach electrical components to said substrate by said adhesive, each application of said adhesive generally being in the form of a dot, and comprising the steps for each application of:
 advancing said tip toward and into engagement with one of said portions of said surface and sensing a reactive force on said tip from said surface;
 recording a position, on a path of said advancing, when a particular value of said reactive force is attained;
 halting said advancing according to attaining said position;
 retracting said tip away from said surface portion and back past said position by a preferred distance;
 applying positive pressure to said flowable adhesive in order to effect said adhesive application;
 sensing a back pressure on said flowable adhesive from said surface during said dispensing; and
 metering said dot of material in response to said back pressure and according to a controller.

10. An apparatus for depositing a dose of flowable material from a tip onto a surface, and comprising:
 means for advancing said tip toward and into engagement with a portion of said surface;
 means for sensing a reactive force on said tip from said surface;
 means for recording a position, on a path of said advancing, when a particular value of said reactive force is attained;
 means for halting said advancing according to attaining said position;
 means for retracting said tip away from said surface portion and back past said position by a preferred distance; and
 means for depositing a dose of said flowable material onto said surface portion from said tip.

11. An apparatus as in claim 10, and further comprising:
 means for dispensing said flowable material to effect said depositing;
 means for applying positive pressure to said material in order to effect said dispensing; and
 means for halting said positive pressure to halt said dispensing.

12. An apparatus as in claim 11, and further comprising:
 means for removing said positive pressure and applying a negative pressure to said flowable material selectively in order to prevent inadvertent dispensing thereof.

13. An apparatus as in claim 10, and further comprising:
 a pressure transducer; and
 means for transmitting at least a portion of said reactive force to said pressure transducer to effect said sensing.

14. An apparatus as in claim 13, wherein said transducer comprises:
 a load cell.

15. An apparatus for depositing a dose of flowable material from a tip onto a surface, and comprising:
 means for advancing said tip toward and into engagement with a portion of said surface;
 means for sensing a reactive engagement force on said tip from said surface;
 means for recording a position, on a path of said advancing, when a particular value of said reactive force is attained;
 means for halting said advancing according to attaining said position;
 means for retracting said tip away from said surface portion and back past said position by a distance sufficient that another engagement force, from said surface via said flowable material, is impressable on said tip during said depositing;
 means for depositing some of said flowable material onto said surface;
 means for sensing said other engagement force on said tip during said depositing; and
 means for controlling said dose in response to said sensing of said other engagement force.

16. An apparatus for positioning a dispensing nozzle tip in spaced relation to a portion of a surface and dispensing a particular dose of flowable material from said tip onto said surface portion, and comprising:
 means for advancing said tip toward and into engagement with said surface portion;
 means for sensing a reactive force on said tip from said surface;
 means for recording a position, on a path of said advancing, when a particular value of said reactive force is attained;
 means for halting said advancing according to attaining said position;
 means for retracting said tip away from said surface portion and back past said position by a preferred distance;
 means for applying positive pressure to said flowable material in order to effect said dispensing;
 means for sensing a back pressure on said flowable material from said surface during said dispensing; and
 means for metering said dose of material in response to said back pressure and according to a controller.

17. An apparatus as in claim 16, and further comprising:
 means for removing said positive pressure and applying a negative pressure to said flowable material selectively in order to prevent inadvertant dispensing thereof.

18. An apparatus for applying flowable adhesive from a nozzle tip to selected portions of a substrate in order to attach electrical components to said substrate by said adhesive, each application of said adhesive generally being in the form of a dot, and said apparatus comprising for each application:

means for advancing said tip toward and into engagement with one of said portions of said surface;

means for sensing a reactive force on said tip from said surface;

means for recording a position, on a path of said advancing, when a particular value of said reactive force is attained;

means for halting said advancing according to attaining said position;

means for retracting said tip away from said surface portion and back past said position by a preferred distance;

means for applying positive pressure to said flowable adhesive in order to effect said adhesive application;

means for sensing a back pressure on said flowable adhesive from said surface during said dispensing; and means for metering said dot of material in response to said back pressure and according to a controller.

* * * * *